(12) United States Patent
Mitsutani

(10) Patent No.: US 8,499,547 B2
(45) Date of Patent: Aug. 6, 2013

(54) HYBRID VEHICLE AND CONTROL METHOD THEREOF

(75) Inventor: Noritake Mitsutani, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 428 days.

(21) Appl. No.: 12/532,966

(22) PCT Filed: Jul. 25, 2007

(86) PCT No.: PCT/JP2007/064579
§ 371 (c)(1),
(2), (4) Date: Sep. 24, 2009

(87) PCT Pub. No.: WO2008/117484
PCT Pub. Date: Oct. 2, 2008

(65) Prior Publication Data
US 2010/0107608 A1    May 6, 2010

(30) Foreign Application Priority Data
Mar. 27, 2007 (JP) .................................. 2007-82217

(51) Int. Cl.
*F01N 3/00* (2006.01)
(52) U.S. Cl.
USPC ................................. 60/284; 60/285; 60/300
(58) Field of Classification Search
USPC ......................................... 60/284, 300, 285
See application file for complete search history.

(56) References Cited

U.S. PATENT DOCUMENTS

| 5,785,138 A | * | 7/1998 | Yoshida ................... 180/65.245 |
| 5,801,499 A | * | 9/1998 | Tsuzuki et al. ................ 318/141 |
| 2006/0021329 A1 | * | 2/2006 | McGee et al. ................... 60/284 |

FOREIGN PATENT DOCUMENTS

| EP | 1223323 A2 | * | 7/2002 |
| JP | 5-222966 A |   | 8/1993 |
| JP | 6-165308 A |   | 6/1994 |
| JP | 2003-247417 A |   | 9/2003 |
| JP | 2004-251178 A |   | 9/2004 |
| JP | 2005-105950 A |   | 4/2005 |

* cited by examiner

*Primary Examiner* — Thomas Denion
*Assistant Examiner* — Anthony Ayala Delgado
(74) *Attorney, Agent, or Firm* — Kenyon & Kenyon LLP

(57) ABSTRACT

Upon a system startup, a hybrid vehicle 20 determines whether a catalyst warm up operation of an engine 22 is to be executed or not based on a catalyst bed temperature Tcat of an exhaust gas purifying catalyst 141 and a state of charge SOC of a battery 50 (S110, S140) and determines whether a forced charging of the battery 50 with an idling of the engine 22 is to be executed or not based on the catalyst bed temperature Tcat, the state of charge SOC and an estimated intake air amount GAidl upon the idling of the engine 22 when the catalyst warm up operation is not to be executed, then controls the engine 22, motors MG1 and MG2 in accordance with determination results (S130, S210).

12 Claims, 6 Drawing Sheets

HYBRID VEHICLE AND CONTROL METHOD THEREOF

This is a 371 national phase application of PCT/JP2007/064579 filed 25 Jul. 2007, claiming priority to Japanese Patent Application No. JP 2007-082217 filed 27 Mar. 2007, the contents of which are incorporated herein by reference.

TECHNICAL FIELD

The present invention relates to a hybrid and a control method thereof.

BACKGROUND ART

Conventionally, there is well-known a hybrid vehicle including an engine, a planetary gear mechanism connected to a first motor and an axle, a second motor connected to the axle, and a battery capable of supplying and receiving electric power from the first and second motors (for example, refer to Patent Document 1). In the hybrid vehicle, the engine is started by a cranking through the use of the first and second motors when a predetermined condition is satisfied and a catalyst warm up operation of the engine is executed while adjusting an ignition timing in a retard side. Thus, a temperature of exhaust gas can be risen so as to facilitate an activation of a catalyst for purifying exhaust gas exhausted from the engine.
[Patent Document 1] Japanese Patent Laid-Open No. 2004-251178

DISCLOSURE OF THE INVENTION

In the above-described hybrid vehicle, even if the catalyst warm up operation is essentially required, the battery is preferably charged with electric power generated by the first motor through the use of power from the engine when a state of charge of battery is less than a predetermined threshold value. However, if the engine is operated to charge the battery in a state where the catalyst is not adequately activated, the exhaust gas is not satisfactorily purified by the catalyst, so that the emission may be deteriorated.

The hybrid vehicle and a control method thereof according to the present invention have an object to appropriately execute a catalyst warm up operation of an internal combustion engine and an operation of the internal combustion engine for charging an accumulator so as to ensure a residual capacity of the accumulator while preventing emission deterioration.

The present invention accomplishes the demand mentioned above by the following configurations applied to a hybrid vehicle and a control method thereof.

A hybrid vehicle according to the present invention is a hybrid vehicle including an internal combustion engine, a purifying unit including a catalyst that purifies exhaust gas exhausted from the internal combustion engine, a catalyst temperature acquisition device that acquires a temperature of the catalyst, an electric power-mechanical power input output structure connected to a predetermined axle and an engine shaft of the internal combustion engine, the electric power-mechanical power input output structure capable of generating electric power through the use of at least part of power from the internal combustion engine and inputting and outputting power to the axle with input and output of electric power, a motor capable of inputting and outputting power to the axle or another axle that is different from the axle, an accumulator capable of supplying and receiving electric power from electric power-mechanical power input output structure and the motor, a residual capacity acquisition module that acquires a residual capacity of the accumulator, a catalyst warm up determination module that determines whether a catalyst warm up operation of the internal combustion engine that facilitates an activation of the catalyst is to be executed or not based on the acquired temperature of the catalyst and the acquired residual capacity upon a system startup, a forced charging determination module that determines whether a forced charging of the accumulator with an idling of the internal combustion engine is to be executed or not based on the acquired temperature of the catalyst, the acquired residual capacity and an estimated intake air amount upon the idling of the internal combustion engine when the catalyst warm up determination module determines that the catalyst warm up operation is not, to be executed, and a control module that controls the internal combustion engine, the electric power-mechanical power input output structure and the motor so that the catalyst warm up operation is executed when the catalyst warm up determination module determines that the catalyst warm up operation is to be executed, the control module controlling the internal combustion engine, the electric power-mechanical power input output structure and the motor so that the forced charging is executed when the forced charging determination module determines that the forced charging is to be executed.

The hybrid vehicle determines whether the catalyst warm up operation of the internal combustion engine that facilitates the activation of the catalyst is to be executed or not based on the temperature of the catalyst that purifies exhaust gas exhausted from the internal combustion engine and the residual capacity of the accumulator upon a system startup. When determined that the catalyst warm up operation is not to be executed, the hybrid vehicle determines whether the forced charging of the accumulator with the idling of the internal combustion engine is to be executed or not based on the temperature of the catalyst, the residual capacity of the accumulator and the estimated intake air amount upon the idling of the internal combustion engine. Then, the internal combustion engine, the electric power-mechanical power input output structure and the motor are controlled so that the catalyst warm up operation is executed when determined that the catalyst warm up operation is to be executed. When determined that the forced charging with the idling of the internal combustion engine is to be executed, the internal combustion engine, the electric power-mechanical power input output structure and the motor are controlled so that the forced charging is executed. By determining whether the warm up operation of the internal combustion engine is to be executed or not based on the temperature of the catalyst and the residual capacity of the accumulator, an execution of the warm up operation of the internal combustion engine can be decided while considering a requirement of a discharge from the accumulator after the determination. Further, a purifying performance of the catalyst correlates with the temperature of the catalyst and the estimated intake air amount upon the idling of the internal combustion engine during the idling of the internal combustion engine for charging the accumulator as the hybrid vehicle. Accordingly, by determining whether the forced charging of the accumulator with the idling of the internal combustion engine is to be executed or not based on the temperature of the catalyst, the residual capacity of the accumulator and the estimated intake air, amount upon the idling of the internal combustion engine when determined that the catalyst warm up operation is not to be executed, it is possible to permit the forced charging of the accumulator with the idling of the internal combustion engine in a state where the exhaust gas from the internal combustion engine is satisfactorily purified by the catalyst. Thus, in the hybrid vehicle, the catalyst warm up operation of the internal combustion engine and the idling of the internal combustion engine to charge the accumulator are appropriately executed, so that the residual capacity of the accumulator can be ensured while preventing emission deterioration.

The catalyst warm up determination module may determine that the catalyst warm up operation is to be executed when the acquired residual capacity is equal to or more than a predetermined warm up execution residual capacity and the acquired temperature of the catalyst is equal to or less than a predetermined warm up execution temperature. Thus, the emission deterioration can be prevented by the execution of the catalyst warm up operation of the internal combustion engine and the residual capacity of the accumulator can be ensured after the execution of the catalyst warm up operation.

The forced charging determination module may determine that the forced charging is to be executed when the acquired residual capacity is equal to or less than a predetermined charging execution residual capacity that is smaller than the warm up execution residual capacity, when the acquired residual capacity is less than the warm up execution residual capacity and the acquired temperature of the catalyst is equal to or more than a predetermined charging execution temperature, and when the acquired residual capacity is more than the charging execution residual capacity and the acquired temperature of the catalyst is equal to or more than a predetermined charging permission lower limit temperature based on the estimated intake air amount. Thus, the forced charging with the idling of the internal combustion engine is executed even if the emission is deteriorated in some degree when the residual capacity of the accumulator is considerably low for example as well as when the forced charging with the idling of the internal combustion engine can be executed without any problems relative to the temperature of the catalyst. Further, when the residual capacity of the accumulator is more than the charging execution residual capacity, the execution of the forced charging with the idling of the internal combustion engine is permitted on the condition that the exhaust gas from the internal combustion engine can be satisfactorily purified by the catalyst. Accordingly, the residual capacity of the accumulator can be ensured while preventing emission deterioration.

The hybrid vehicle may further include a temperature acquisition module that acquires a temperature of the internal combustion engine, and a shift position selection device that allows a driver to select at least a shift position for a stop of the vehicle and a shift position for a normal driving. The estimated intake air amount may be derived based on the acquired temperature of the internal combustion engine and the shift position, and wherein the charging permission lower limit temperature is changed in accordance, with the derived estimated intake air amount. The intake air amount upon the idling of the internal combustion engine typically increases with a decrease of the temperature of the internal combustion engine. Further, the intake air amount upon the idling of the internal combustion engine may be different between when the shift position for the stop of the vehicle is set and when the shift position for a normal driving is set. Accordingly, the intake air amount upon the idling can be accurately obtained by deriving the intake air amount based on the temperature of the internal combustion engine and the shift position. Thus, it is possible to appropriately determine whether the forced charging of the accumulator with the idling of the internal combustion engine is to be executed or not by changing the charging permission lower limit temperature in accordance with the derived estimated intake air amount.

The charging execution residual capacity may be changed in accordance with a state of a load of the accumulator. Thus, it is possible to minimally ensure the residual capacity according to the state of the load of the accumulator and reduce components inoperable due to a shortage of the residual capacity of the accumulator.

A rotational speed of the internal combustion engine may be retained at a predetermined rotational speed by the electric power-mechanical power input output structure upon an execution of the catalyst warm up operation and an ignition timing of the internal combustion engine may be retarded in comparison with a normal state upon the execution of the catalyst warm up operation. Thus, a temperature of the exhaust gas increases upon the execution of the catalyst warm up operation so as to favorably facilitate the activation of the catalyst that purifies exhaust gas from the internal combustion engine.

The catalyst warm up determination module and the forced charging determination module may determine whether or not executing the catalyst warm up operation or the forced charging while the hybrid vehicle is stopped after a system startup.

The electric power-mechanical power input output structure may include a power generation motor capable of inputting and outputting power; and three shaft-type power input output assembly connected to three shafts, the axle, the engine shaft of the internal combustion engine and a rotating shaft of the power generation motor. The three shaft-type power input output assembly may be configured to input and output power to one remaining shaft, based on input and output of power from and to any two shafts selected among the three shafts.

The control method of a hybrid vehicle according to the present invention is a control method of a hybrid vehicle including an internal combustion engine, a purifying unit including a catalyst that purifies exhaust gas exhausted from the internal combustion engine, an electric power-mechanical power input output structure connected to a predetermined axle and an engine shaft of the internal combustion engine, the electric power-mechanical power input output structure capable of generating electric power through the use of at least part of power from the internal combustion engine and inputting and outputting power to the axle with input and output of electric power, a motor capable of inputting and outputting power to the axle or another axle that is different from the axle and an accumulator capable of supplying and receiving electric power from electric power-mechanical power input output structure and the motor, the method including the steps of:

(a) determining whether a catalyst warm up operation of the internal combustion engine that facilitates an activation of the catalyst is to be executed or not based on a temperature of the catalyst and a residual capacity of the accumulator;

(b) determining whether a forced charging of the accumulator with an idling of the internal combustion engine is to be executed or not based on the temperature of the catalyst, the residual capacity of the accumulator, and an estimated intake air amount upon the idling of the internal combustion engine when the Step (a) determines that the catalyst warm up operation is not to be executed, and (c) controlling the internal combustion engine, the electric power-mechanical power input output structure and the motor so that the catalyst warm up operation is executed when the Step (a) determines that the catalyst warm up operation is to be executed, and controlling the internal combustion engine, the electric power-mechanical power input output structure and the motor so that the forced charging is executed when the Step (b) determines that the forced charging is to be executed.

As the method, by determining whether the warm up operation of the internal combustion engine is to be executed or not based on the temperature of the catalyst and the residual capacity of the accumulator, an execution of the warm up operation of the internal combustion engine can be decided while considering a requirement of a discharge from the accumulator after the determination. Further, a purifying performance of the catalyst correlates with the temperature of the catalyst and the estimated intake air amount upon the idling of the internal combustion engine during the idling of the internal combustion engine for charging the accumulator. Accordingly, by determining whether the forced charging of the accumulator with the idling of the internal combustion engine is to be executed or not based on the temperature of the catalyst, the residual capacity of the accumulator and the estimated intake air amount upon the idling of the internal combustion engine when determined that the catalyst warm up operation is not to be executed, it is possible to permit the forced charging of the accumulator with the idling of the internal combustion engine in a state where the exhaust gas from the internal combustion engine is satisfactorily purified by the catalyst. Thus, according to the method, the catalyst warm up operation of the internal combustion engine and the idling of the internal combustion engine to charge the accumulator are appropriately executed, so that the residual capacity of the accumulator can be ensured while preventing emission deterioration.

The Step (a) may determine that the catalyst warm up operation is to be executed when the residual capacity of the accumulator is equal to or more than a predetermined warm up execution residual capacity and the temperature of the catalyst is equal to or less than a predetermined warm up execution temperature.

The Step (b) may determine that the forced charging is to be executed when the residual capacity of the accumulator is equal to or less than a predetermined charging execution residual capacity that is smaller than the warm up execution residual capacity, when the residual capacity of the accumulator is less than the warm up execution residual capacity and the temperature of the catalyst is equal to or more than a predetermined charging execution temperature, and when the residual capacity of the accumulator is more than the charging execution residual capacity and the temperature of the catalyst is equal to or more than a predetermined charging permission lower limit temperature based on the estimated intake air amount.

The estimated intake air amount may be derived based on the temperature of the internal combustion engine and the shift position of a shift position selection device that allows a driver to select at least a shift position for a stop of the vehicle and a shift position for a normal driving, and the charging permission lower limit temperature may be changed in accordance with the derived estimated intake air amount.

The charging execution residual capacity may be changed in accordance with a state of a load of the accumulator.

A rotational speed of the internal combustion engine may be retained at a predetermined rotational speed by the electric power-mechanical power input output structure upon an execution of the catalyst warm up operation at the Step (c) and an ignition timing of the internal combustion engine may be retarded in comparison with a normal state upon the execution of the catalyst warm up operation at the Step (c).

The Step (a) may be executed while the hybrid vehicle is stopped after a system startup.

In the control method of a hybrid vehicle according to the present invention, the electric power-mechanical power input output structure of the hybrid vehicle may include a power generation motor capable of inputting and outputting power, and three shaft-type power input output assembly connected to three shafts, the axle, the engine shaft of the internal combustion engine and a rotating shaft of the power generation motor. The three shaft-type power input output assembly may be configured to input and output power to one remaining shaft, based on input and output of power from and to any two shafts selected among the three shafts.

BEST MODES OF CARRYING OUT THE INVENTION

Now, the best mode for carrying out the present invention will be described with reference to an embodiment.

Figure 1:
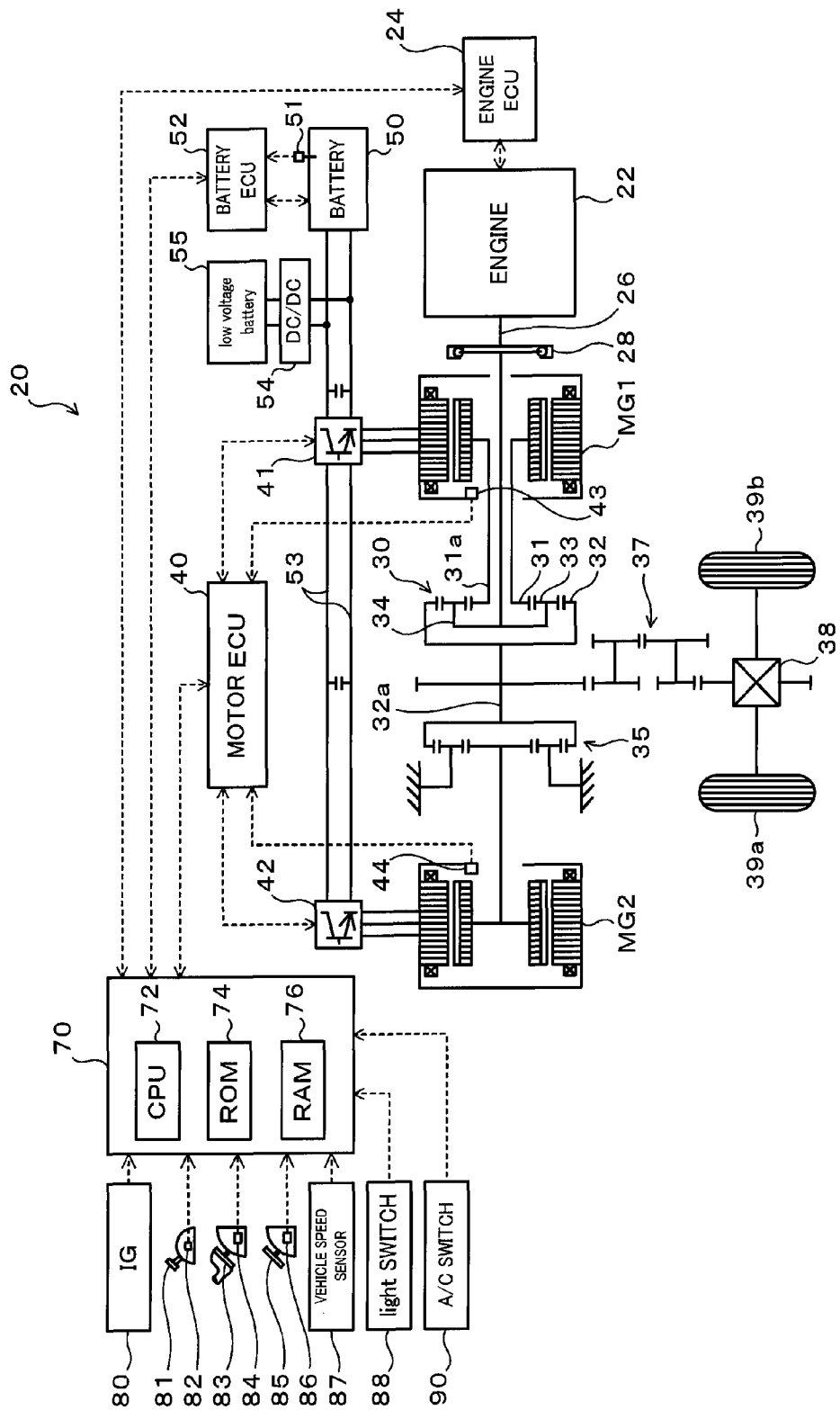
FIG. 1 is a schematic block diagram of a hybrid vehicle 20 according one embodiment of the present invention.

FIG. 1 schematically illustrates the configuration of a hybrid vehicle 20 in one embodiment of the invention. The hybrid vehicle 20 of the illustrated configuration includes an engine 22, a three shaft-type power distribution integration mechanism 30 connected via a damper 28 to a crankshaft 26 or an output shaft of the engine 22, a motor MG1 connected to the power distribution integration mechanism 30 and designed to have power generation capability, a reduction gear 35 attached to a ring gear shaft 32*a* as an axle connected to the power distribution integration mechanism 30, a motor MG2 connected to the ring gear shaft 32*a* via the reduction gear 35, and a hybrid electronic control unit 70 (hereinafter referred to as "hybrid ECU") configured to control the operations of the whole hybrid vehicle 20.

Figure 2:
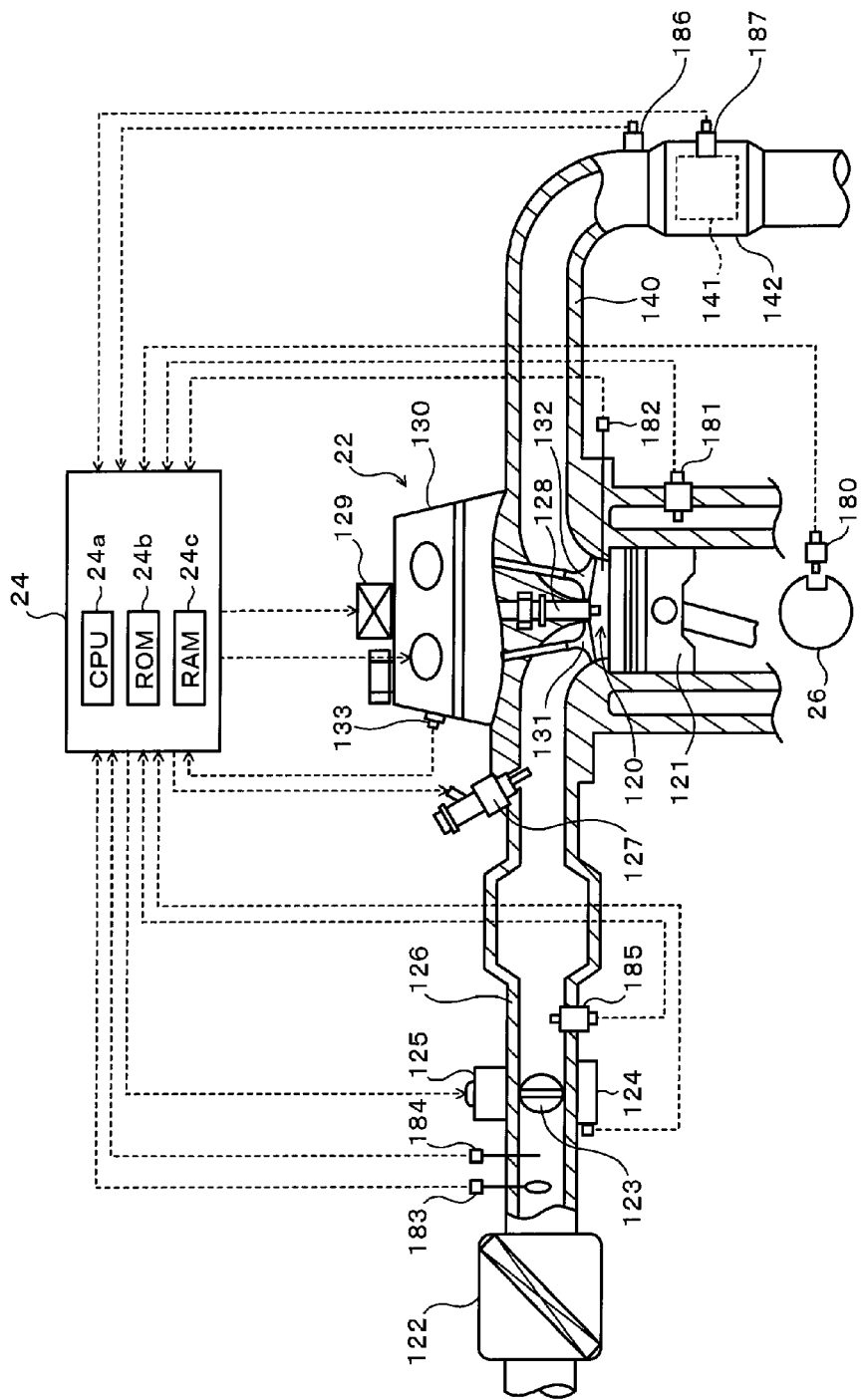
FIG. 2 is a schematic block diagram of an engine 22.

As shown in FIG. 2, the engine 22 is constructed as an internal combustion engine that makes an air fuel mixture of air and a hydrocarbon fuel such as gasoline or light oil explosively combusted in a combustion chamber 120 and converts reciprocating motion of a piston 121 induced by the explosive combustion of the air fuel mixture into rotational motion of a crankshaft 26 so as to output power. In the engine 22, the air cleaned by an air cleaner 122 is taken into an air intake pipe 126 through a throttle valve 123, while the fuel such as gasoline is injected from a fuel injection valve 127 to be mixed with the intake air. The resulting air fuel mixture is introduced into the combustion chamber 120 through an air intake valve 131 operated by a valve operating mechanism 130 constructed as a variable valve timing mechanism and is ignited with electric spark made by a spark plug 128 to be explosively combusted. The exhaust gas from the engine 22 goes through an exhaust valve 132 and an exhaust manifold 140 and is introduced into a purify unit 142 including an exhaust gas purifying catalyst (three-way catalyst) 141 that purifies the exhaust gas by conversion of toxic components included in the exhaust gas, that is, carbon monoxide (CO), hydrocarbons (HC), and nitrogen oxides (NOx), into harmless components. The exhaust gas purified by the purify unit 142 is discharged to the outside air.

The engine 22 constructed as discussed above is under control of an engine electronic control unit (hereafter referred to as engine ECU) 24. As shown in FIG. 2, the engine ECU 24 is constructed as a microprocessor including a CPU 24a, a ROM 24b configured to store various processing programs, a RAM 24c configured to temporarily store data, input and output ports (not shown), and a communication port (not shown). The engine ECU 24 receives, via its input port, signals from various sensors designed to measure and detect the operating conditions of the engine 22. For example, the signals input into the engine ECU 24 include a crank position from a crank position sensor 180 that detects a rotational position of the crankshaft 26, a cooling water temperature Tw from a water temperature sensor 181 that measures a temperature of cooling water in the engine 22, an in-cylinder pressure from an in-cylinder pressure sensor 182 that detects an internal pressure of the combustion chamber 120, cam positions from a cam position sensor 133 that detects rotational positions of camshafts included in the valve operating mechanism 130 for operating the air intake valve 131 and the exhaust valve 132, a throttle position from a throttle valve position sensor 124 that detects a position of the throttle valve 123, an intake air amount GA from an air flow meter 183 that detects an intake air amount as a load of the engine 22, an intake air temperature from an intake air temperature sensor 184 mounted on the air intake pipe 126, a negative intake air pressure Pi from an intake air pressure sensor 185 that detects a negative pressure in the air intake pipe 126, an air-fuel ratio AF from an air-fuel ratio sensor 186 mounted on the exhaust manifold 140 in the upstream of the purify unit 142, a catalyst bed temperature Tcat from a catalyst temperature sensor 187 that detects a temperature of the exhaust gas purifying catalyst 141, and the like. The engine ECU 24 outputs, via its output port, diverse control signals and driving signals to drive and control the engine 22. For example, the signals output from the engine ECU 24 include a driving signal to the fuel injection valve 127, a driving signal to a throttle motor 125 driven to regulate the position of the throttle valve 123, a control signal to an ignition coil 129 integrated with an igniter, a control signal to the valve operating mechanism 130, and the like. The engine ECU 24 establishes communication with the hybrid ECU 70 to control the operations of the engine 22 in response to control signals from the hybrid ECU 70 and to output data regarding the operating conditions of the engine 22 to the hybrid ECU 70 according to the requirements.

The power distribution integration mechanism 30 includes a sun gear 31 as an external gear, a ring gear 32 as an internal gear arranged concentrically with the sun gear 31, multiple pinion gears 33 arranged to engage with the sun gear 31 and with the ring gear 32, and a carrier 34 arranged to hold the multiple pinion gears 33 in such a manner as to allow both their revolutions and their rotations on their axes. The power distribution integration mechanism 30 is thus constructed as a planetary gear mechanism including the sun gear 31, the ring gear 32, and the carrier 34 as the rotational elements of differential motions. The carrier 34 as an engine-side rotational element, the sun gear 31, and the ring gear 32 as an axle-side rotational element in the power distribution integration mechanism 30 are respectively connected to the crankshaft 26 of the engine 22, to the motor MG1, and to the reduction gear 35 via the ring gear shaft 32a. When the motor MG1 functions as a generator, the power distribution integration mechanism 30 distributes the power of the engine 22 input via the carrier 34 into the sun gear 31 and the ring gear 32 corresponding to their gear ratio. When the motor MG1 functions as a motor, on the other hand, the power distribution integration mechanism 30 integrates the power of the engine 22 input via the carrier 34 with the power of the motor MG1 input via the sun gear 31 and outputs the integrated power to the ring gear 32. The power output to the ring gear 32 is transmitted from the ring gear shaft 32a through a gear mechanism 37 and a differential gear 38 and is eventually output to drive wheels 39a and 39b of the hybrid vehicle 20.

The motors MG1 and MG2 are constructed as known synchronous motor generators to enable operations as both a generator and a motor. The motors MG1 and MG2 receive and supply electric power to a battery 50 as a secondary cell via inverters 41 and 42. Power lines 54 connecting the battery 50 with the inverters 41 and 42 are structured as common positive bus and negative bus shared by the inverters 41 and 42. Such connection enables electric power generated by one of the motors MG1 and MG2 to be consumed by the other motor MG2 or MG1. The battery 50 may thus be charged with surplus electric power generated by either of the motors MG1 and MG2, while being discharged to supplement insufficient electric power. The battery 50 is neither charged nor discharged upon the balance of the input and output of electric power between the motors MG1 and MG2. Both the motors MG1 and MG2 are driven and controlled by a motor electronic control unit 40 (hereinafter referred to as "motor ECU"). The motor ECU 40 inputs various signals required for driving and controlling the motors MG1 and MG2, for example, signals representing rotational positions of rotors in the motors MG1 and MG2 from rotational position detection sensors 43 and 44 and signals representing phase currents to be applied to the motors MG1 and MG2 from current sensors (not shown). The motor ECU 40 outputs switching control signals to the inverters 41 and 42. The motor ECU 40 also computes rotational speeds Nm1 and Nm2 of the rotors in the motors MG1 and MG2 according to a rotational speed computation routine (not shown) based on the output signals of the rotational position detection sensors 43 and 44. The motor ECU 40 establishes communication with the hybrid ECU 70 to drive and control the motors MG1 and MG2 in response to control signals received from the hybrid ECU 70 and to output data regarding the operating conditions of the motors MG1 and MG2 to the hybrid ECU 70 according to the requirements.

The battery 50 is under control and management of a battery electronic control unit 52 (hereinafter referred to as "battery ECU"). The battery ECU 52 inputs various signals required for management and control of the battery 50, for example, an inter-terminal voltage from a voltage sensor (not shown) located between terminals of the battery 50, a charge-discharge current from a current sensor (not shown) located in the power line 54 connecting with the output terminal of the battery 50, and a battery temperature Tb from a temperature sensor 51 attached to the battery 50. The battery ECU 52 outputs data regarding the operating conditions of the battery 50 by data communication to the hybrid ECU 70 and the engine ECU 24 according to the requirements. The battery ECU 52 also performs various arithmetic operations for management and control of the battery 50. A residual capacity or a state of charge SOC of the battery 50 is calculated from an integrated value of the charge-discharge current measured by the current sensor. A charge-discharge power demand Pb* is set, based on the calculated state of charge SOC of the battery 50. An input limit Win as an allowable charging electric power to be charged in the battery 50 and an output limit Wout as an allowable discharging electric power to be discharged from the battery 50 are set corresponding to the calculated state of charge SOC and the battery temperature Tb. The input and output limits Win and Wout of the battery 50 are set by setting a basic value depending on the battery temperature Tb and setting an input limit correction coefficient and an output limit correction coefficient based on the state of charge SOC of the battery 50, and then multiplying the set basic value of the input and output limits Win and Wout by the set correction coefficient. The battery 50 is also used as a power source of an electric compressor that constructs a refrigeration cycle included in an air conditioning unit (not shown) for an air conditioning (heating and cooling) of a vehicle room, and the like. Further, a low voltage battery 55 is connected to the battery 50 via a DC/DC converter 54 that converts the voltage. A voltage of electric power from the battery 50 in a high voltage side is dropped by the DC/DC converter 54 and the electric power is supplied to a side of the low voltage battery 55. The low voltage battery 55 is uses as a power source of auxiliary equipments such as head and tail lights.

The hybrid ECU 70 is constructed as a microprocessor including a CPU 72, a ROM 74 configured to store processing programs, a RAM 76 configured to temporarily store data, input and output ports (not shown), and a communication port (not shown). The hybrid ECU 70 inputs, via its input port, an ignition signal from an ignition switch (start switch) 80, a shift position SP or a current setting position of a shift lever 81 from a shift position sensor 82, an accelerator opening Acc or the driver's depression amount of an accelerator pedal 83 from an accelerator pedal position sensor 84, a brake pedal stroke BS or the driver's depression amount of a brake pedal 85 from a brake pedal stroke sensor 86, a vehicle speed V from a vehicle speed sensor 87, an on/off signal from a light switch 88 for instructing a light up or an extinction of the head and tail lights, an air conditioning on/off signal from an A/C switch (air conditioning execution instruction switch) 90 for instructing an execution of the air conditioning by the air conditioning unit, and the like. As described above, the hybrid ECU 70 is connected via the communication port with the engine ECU 24, the motor ECU 40, the battery ECU 52, and the like, and exchanges various control signals and data with the engine ECU 24, the motor ECU 40, the battery ECU 52, and the like. In the embodiment, shift positions settable with the shift lever 82 include a parking position (P position) used at parking, a reverse position (R position) for reverse driving, a neutral position (N position), a drive position (D position) for forward driving, and the like.

The hybrid vehicle 20 constructed as described above sets a torque demand, which is to be output to the ring gear shaft 32a or the driveshaft linked with an axle of the hybrid vehicle 20, based on the vehicle speed V and the accelerator opening Acc corresponding to the driver's depression amount of the accelerator pedal 83, and controls the operations of the engine 22, the motors MG1 and MG2 to ensure output of power equivalent to the set torque demand to the ring gear shaft 32a. There are several drive control modes of the engine 22, the motors MG1 and MG2. In a torque conversion drive mode, while the engine 22 is driven and controlled to ensure output of the power equivalent to the torque demand, the motors MG1 and MG2 are driven and controlled to enable all the output power of the engine 22 to be subjected to torque conversion by the power distribution integration mechanism 30, the motors MG1 and MG2 and to be output to the ring gear shaft 32a. In a charge-discharge drive mode, the engine 22 is driven and controlled to ensure output of power corresponding to the sum of a power demand and electric power required for charging the battery 50 or electric power to be discharged from the battery 50. The motors MG1 and MG2 are driven and controlled to enable all or part of the output power of the engine 22 with charge or discharge of the battery 50 to be subjected to torque conversion by the power distribution integration mechanism 30, the motors MG1 and MG2 and to ensure output of the power demand to the ring gear shaft 32a. In a motor drive mode, the motor MG2 is driven and controlled to ensure output of power equivalent to the power demand to the ring gear shaft 32a, while the engine 22 stops its operation. In the embodiment, the engine 22 is stopped and the drive control mode is changed into the motor drive mode that makes the motor MG2 output power equivalent to the torque demand when a predetermined engine stop condition is satisfied in the torque conversion drive mode and the like where the engine 22 is operated.

Figure 3:
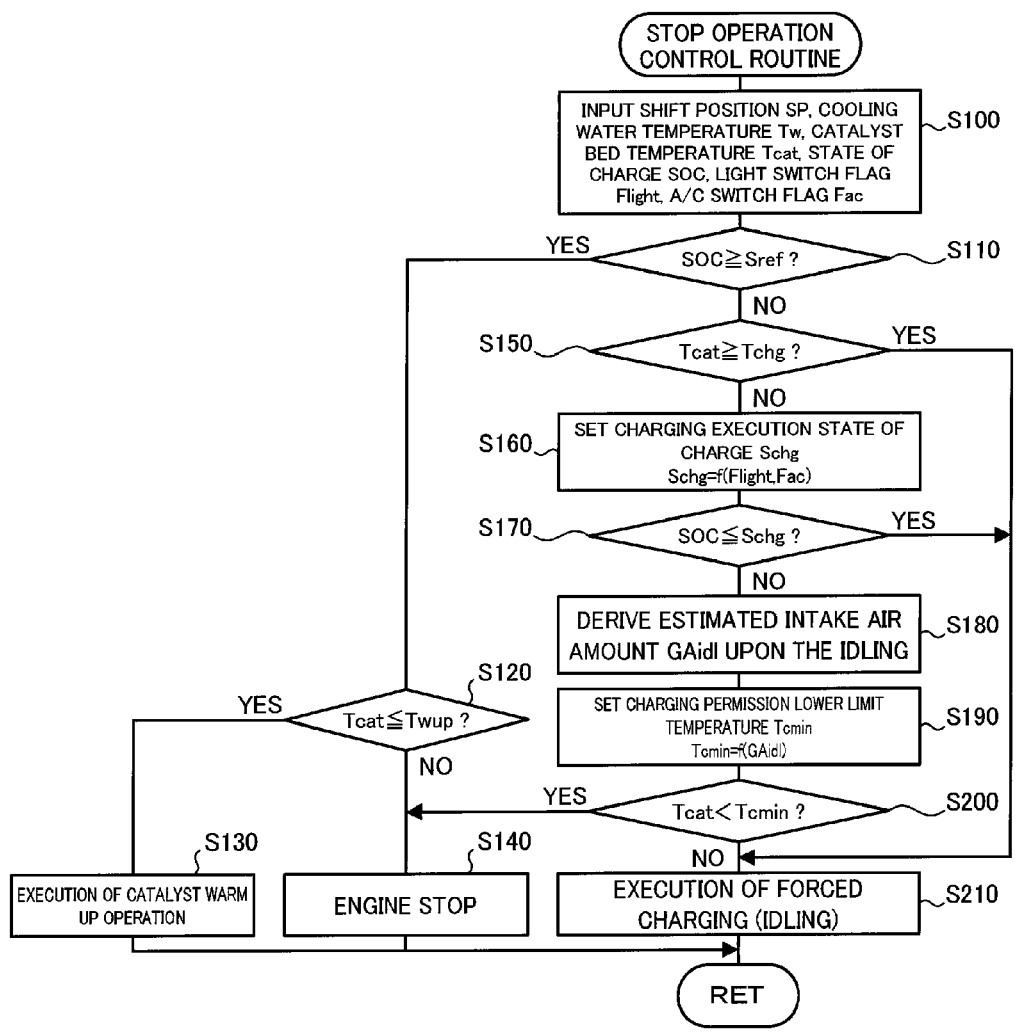
FIG. 3 is a flowchart exemplifying an example of a stop operation control routine executed by a hybrid electric control unit 70 in the embodiment.

Next, an operation of the hybrid vehicle 20, in particularly an operation while the hybrid vehicle 20 is stopped after a system startup by turning on the IG switch 80 will be described. FIG. 3 is a flowchart exemplifying an example of a stop operation control routine executed by a hybrid electric control unit 70 at preset time intervals while the hybrid vehicle 20 is stopped after the system startup by turning on the IG switch 80.

At start of the stop operation control routine in FIG. 3, the CPU 72 of the hybrid ECU 70 executes an input process of data required for control such as the shift position SP from the shift position sensor 82, the cooling water temperature Tw detected by the water temperature sensor 181, the catalyst bed temperature Tcat detected by the catalyst temperature sensor 187, the state of charge SOC of the battery 50, a value of a predetermined light switch flag Flight, and a value of an A/C switch flag Fac (Step S100). In the embodiment, the cooling water temperature Tw and the catalyst bed temperature Tcat are input from the engine ECU 24 that receives them from the water temperature sensor 181 and the catalyst temperature sensor 187. The state of charge SOC is input from the battery ECU 52. The light switch flag Flight is set to value "0" during the extinction of the head and tail lights and is set to value "1" during the light up of the head and tail lights in response to an operation of the light switch 88 by the driver. A value of the light switch flag Flight is stored in a predetermined storage area. The A/C switch flag Fac is set to value "0" when the A/C switch 90 is turned off and is set to value "1" when the A/C switch 90 is turned on. A value of the A/C switch flag Fac is stored in a predetermined storage area. The catalyst bed temperature Tcat may be a value estimated from the intake air amount GA from the air flow meter 183, the cooling water temperature Tw from the water temperature sensor 181, the air-fuel ratio AF from the air-fuel ratio sensor 186, a retard amount of an ignition timing, and the like, instead of the detected value by the catalyst temperature sensor 187.

After the data input at Step S100, the CPU 72 determines whether the input state of charge SOC of the battery 50 is equal to or more than a predetermined warm up execution state of charge Sref (for example, about 30%) or not (Step S110). When the state of charge SOC is equal to or more than the warm up execution state of charge Sref the CPU 72 determines whether the catalyst bed temperature Tcat input at Step S100 is equal to or less than a predetermined warm up execution temperature Twup (for example, 300° C.) or not (Step S120). When the catalyst bed temperature Tcat is equal to or less than the warm up execution temperature Twup (for example, a system startup in a cold state), a catalyst warm up operation of the engine 22 is performed (Step S130) and the processes of and after Step S100 are executed again. When the catalyst bed temperature Tcat is more than the warm up execution temperature Twup, stop state of the engine 22 are retained (Step S140) and the processes of and after Step S100 are executed again. When the engine 22 is not started before an execution of the catalyst warm up operation of the engine 22, a cranking of the engine 22 is performed by the motor MG1 so as to start the engine 22 while discharging the battery 50 and canceling torque applied to the ring gear shaft 32a or the axle from the motor MG1 by torque from the motor MG2. Then, a fuel injection control and an ignition control are started to operate the engine 22. Upon the catalyst warm up operation, a rotational speed Ne of the engine 22 is held at a predetermined rotational speed (for example, idle speed) through the torque output from the motor MG1 and the ignition timing is more retarded than a normal ignition timing. The execution of the above catalyst warm up operation allows a temperature of exhaust gas to rise and facilitates an activation of the exhaust gas purifying catalyst 141 for purifying the exhaust gas from the engine 22. To execute the catalyst warm up operation, the hybrid ECU 70 sets a target rotational speed Ne* and a target torque Te* of the engine 22, a torque command Tm1* of the motor MG1 and a torque command Tm2* of the motor MG2 in accordance with a predetermined procedure. Then, the hybrid ECU 70 sends the target rotational speed Ne* and the target torque Te* to the engine ECU 24 and the torque commands Tm1* and Tm2* to the motor ECU 40. The engine ECU 24 receives the target rotational speed Ne* and the target torque Te* and performs the fuel injection control and the ignition control so as to ensure the target rotational speed Ne* and the target torque Te* in accordance with a control procedure for the catalyst warm up operation. The motor ECU 40 receives the torque commands Tm1* and Tm2* and performs switching control of switching elements included in the respective inverters 41 and 42 so that the motor MG1 is driven in accordance with the torque command Tm1* and the motor MG2 is driven in accordance with the torque command Tm2*. To execute the catalyst warm up operation of the engine 22, since the battery 50 is basically discharged upon the start of the engine 22 and the catalyst warm up operation thereafter, the above warm up execution state of charge Sref is preferably set to have a sufficient margin so that a necessary state of charge SOC can be ensured after the execution of the catalyst warm up operation.

When the state of charge SOC of the battery 50 input at Step S100 is less than the warm up execution state of charge Sref, the CPU 72 determines that the catalyst warm up operation should not be executed at Step S110 and determines whether the catalyst bed temperature Tcat input at Step S100 is equal to or more than a predetermined charging execution temperature Tchg (for example, 200° C.) or not (Step S150). The charging execution temperature Tchg as a threshold value used at Step S150 is defined as a catalyst bed temperature that sufficiently ensures purifying performance of the exhaust gas purifying catalyst 141 upon an idling of the engine 22. When the catalyst bed temperature Tcat is equal to or more than a predetermined charging execution temperature Tchg, a forced charging of the battery 50 with the idling of the engine 22 is executed while the hybrid vehicle 20 is stopped (Step S210) and the processes of and after Step S100 are executed again. When the engine 22 is not started before an execution of the forced charging of the battery 50 with the idling of the engine 22, the engine 22 is started in accordance with the above procedure. The CPU 72 sets the target rotational speed Ne*, the target torque Te* of the engine 22, and the torque commands Tm1* and Tm2* of the motors MG1 and MG2 so that the engine 22 outputs a predetermined torque and rotates at an idle rotational speed Neidl corresponding to the shift position SP. Then, the hybrid ECU 70 sends the target rotational speed Ne* and the target torque Te* of the engine 22 to the engine ECU 24 and the torque commands Tm1* and Tm2* of the motors MG1 and MG2 to the motor ECU 40. Thus, the battery 50 can be charged with electric power generated by the motor MG1 during the idling of the engine 22.

When the catalyst bed temperature Tcat is less than a predetermined charging execution temperature Tchg at Step S150, the CPU 72 sets a charging execution state of charge Schg based on the value of the light switch flag Flight and the value of the A/C switch flag Fac input at Step S100 (Step S160). The charging execution state of charge Schg is principally defined as a value smaller than the warm up execution state of charge Sref so as to forcefully charge the battery 50 even if emission is deteriorated in some degree when the state of charge SOC of the battery 5 is considerably low. In the embodiment, a base value (for example, 10%) of the charging execution state of charge Schg is previously defined. When the head and tail lights are lighted up and the light switch flag Flight is set value "1", the charging execution state of charge Schg is set to a value obtained by adding a positive predetermined value S1 (for example, 2%) to the base value. When the A/C switch 90 is turned on the A/C switch flag Fac is set value "1", the charging execution state of charge Schg is set to a value obtained by adding a positive predetermined value S2 (for example, 3%) to the base value. When the light switch flag Flight and A/C switch flag Fac are respectively set value "1", the charging execution state of charge Schg is set to a value obtained by adding the values S1 and S2 to the base value. In the embodiment, the charging execution state of charge Schg is changed in accordance with a load of the battery 50. Then, the CPU 72 determines whether the state of charge SOC of the battery 50 input at Step S100 is equal to or less than the charging execution state of charge Schg (Step S170). When the state of charge SOC is equal to or less than the charging execution state of charge Schg, the above forced charging of the battery 50 with the idling of the engine 22 is executed (Step S210). Thus, the battery 50 is forcefully charged even if emission is deteriorated in some degree when the state of charge SOC of the battery 50 is considerably low, thereby protecting the battery 50 and the like.

Figure 4:
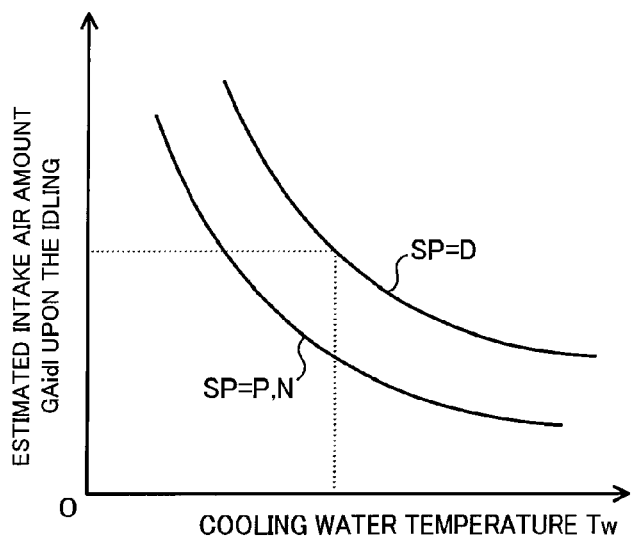
FIG. 4 is a view illustrating an example of an estimated intake air amount deriving map.

On the other hand, when determined that the state of charge SOC of the battery 50 input at Step S100 is more than the charging execution state of charge Schg at Step S170, an estimated intake air amount GAidl (g/s) upon the idling of the engine 22 is derived based on the shift position SP input at Step S100 and the cooling water temperature Tw of the engine 22 (Step S180). The intake air amount upon the idling of the engine 22 typically increases with a decrease of the cooling water temperature Tw of the engine 22. Further, in the hybrid vehicle 20 of the embodiment, the idle rotational speed Neidl of the engine 22 is set to be different between when the shift position SP is the P or N position for the parking and when the shift position SP is D position for the normal driving. Accordingly, the intake air amount upon the idling of the engine 22 changes in accordance with the shift position SP. In the embodiment, the estimated intake air amount GAidl corresponding to the given cooling water temperature Tw and the given shift position SP is derived from an estimated intake air amount setting map previously stored in the ROM 74 and defining a relationship between the cooling water temperature Tw, the given shift position SP and the estimated intake air amount GAidl upon the idling of the engine 22. FIG. 4 illustrates an example of the estimated intake air amount setting map.

Figure 5:
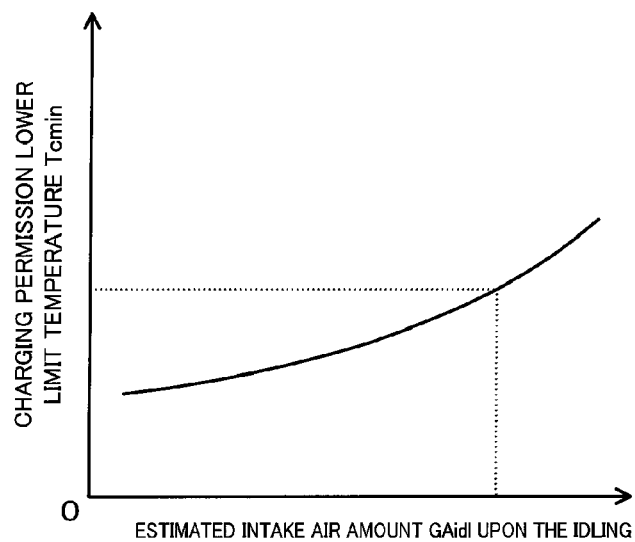
FIG. 5 is a view illustrating an example of a charging permission lower limit temperature setting map.
Figure 6:
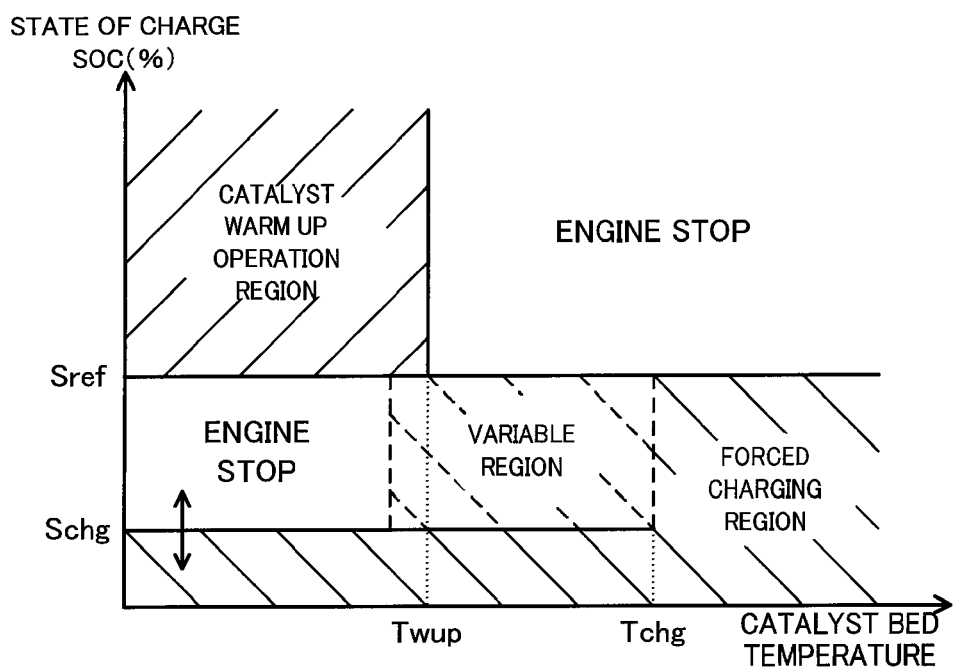
FIG. 6 is a view exemplifying a relationship between a state of charge of the battery 50, a catalyst bed temperature Tcat and an operational state of the engine 22.

After setting the estimated intake air amount GAidl, the CPU 72 sets a charging permission lower limit temperature Tcmin based on the derived estimated intake air amount GAidl (Step S190). Here, the emission can not be improved and the state of charge SOC of the battery can not be ensured if both the catalyst warm up operation and the forced charging of the battery 50 are not performed when the state of charge SOC of the battery 50 is less than the warm up execution state of charge Sref and more than a charging execution state of charge Schg as well as the catalyst bed temperature Tcat is less than the charging execution temperature Tchg. In such a case, it is desirable to ensure the state of charge SOC of the battery 50 while preventing emission deterioration. Further, the purifying performance of the exhaust gas purifying catalyst 141 correlates with the catalyst bed temperature Tcat and the estimated intake air amount GAidl upon the idling of the engine 22 during the idling of the engine 22 for charging the battery 50 while the hybrid vehicle 20 is stopped. That is, the exhaust gas from the engine 22 is satisfactorily purified without remarkable emission deterioration even if the catalyst bed temperature is somewhat low when the intake air amount (exhaust gas amount) upon the idling of the engine 22 is small. In consideration of this, in the embodiment, the charging permission lower limit temperature Tcmin corresponding to the given estimated intake air amount GAidl is derived from an charging permission lower limit temperature setting map previously stored in the ROM 74 and defining a relationship between the estimated intake air amount GAidl upon the idling of the engine 22 and the charging permission lower limit temperature Tcmin. FIG. 5 illustrates an example of the charging permission lower limit temperature setting map. After setting the charging permission lower limit temperature Tcmin, the CPU 72 determines whether or not the catalyst bed temperature Tcat input at Step S100 is less than the charging permission lower limit temperature Tcmin (Step S200). When the catalyst bed temperature Tcat is less than the charging permission lower limit temperature Tcmin, the engine 22 is continuously stopped (Step S140) and the processes of and after Step S100 are executed again. When the catalyst bed temperature Tcat is equal to or more than the charging permission lower limit temperature Tcmin, the forced charging of the battery 50 with the idling of the engine 22 is executed while the hybrid vehicle 20 is stopped (Step S210) and the processes of and after Step S100 are executed again. Thus, as shown in FIG. 6, the battery 50 can be charged so as to increase the state of charge SOC during the idling of the engine 22 within a range (variable region in FIG. 6) that does not result in emission deterioration even if the state of charge SOC of the battery 50 is less than the warm up execution state of charge Sref and more than the charging execution state of charge Schg as well as the catalyst bed temperature Tcat is less than the charging execution temperature Tchg.

As has been described above, the hybrid vehicle 20 determines whether the catalyst warm up operation of the engine 22 that facilitates the activation of the exhaust gas purifying catalyst 141 is to be executed or not based on the catalyst bed temperature Tcat of the exhaust gas purifying catalyst 141 that purifies the exhaust gas from the engine 22 and the state of charge SOC of the battery 50 upon the system startup (Steps S110, S140). When determined that the catalyst warm up operation is not to be executed, the hybrid vehicle 20 determines whether the forced charging of the battery 50 with the idling of the engine 22 is to be executed or not based on the catalyst bed temperature Tcat, the state of charge SOC of the battery 50 and the estimated intake air amount GAidl upon the idling of the engine 22 (Steps S150-S200). Then, the engine 22, the motors MG1 and MG2 are controlled so that the catalyst warm up operation is executed when determined that the catalyst warm up operation is to be executed (Step S130). When determined that the forced charging with the idling of the engine 22 is to be executed, the engine 22, the motors MG1 and MG2 are controlled so that the forced charging is executed (Step S210). By determining whether the warm up operation of the engine 22 is to be executed or not based on the of the catalyst bed temperature Tcat and the state of charge SOC of the battery 50, the execution of the warm up operation of the engine 22 can be decided while considering a requirement of the discharge from the battery 50 after the determination. Further, the purifying performance of the exhaust gas purifying catalyst 141 correlates with the catalyst bed temperature Tcat and the estimated intake air amount GAidl upon the idling of the engine 22 during the idling of the engine 22 for charging the battery 50 while the hybrid vehicle 20 is stopped as the hybrid vehicle 20. Accordingly, by determining whether the forced charging of the battery 50 with the idling of the engine 22 is to be executed or not based on the catalyst bed temperature Tcat, the state of charge SOC of the battery 50 and the estimated intake air amount GAidl upon the idling of the engine 22 when determined that the catalyst warm up operation is not to be executed, it is possible to permit the forced charging of the battery 50 with the idling of the engine 22 in a state where the exhaust gas from the engine 22 is satisfactorily purified by the exhaust gas purifying catalyst 141. Thus, in the hybrid vehicle 20, the catalyst warm up operation of the engine 22 and the idling of the engine 22 to charge the battery 50 are appropriately executed, so that the state of charge SOC of the battery 50 can be ensured while preventing emission deterioration.

By determining that the catalyst warm up operation is to be executed when the state of charge SOC is equal to or more than the warm up execution state of charge Sref and the catalyst bed temperature Tcat is equal to or less than the warm up execution temperature Twp, the emission deterioration can be prevented by the execution of the catalyst warm up operation of the engine 22 and the state of charge SOC of the battery 50 can be ensured after the execution of the catalyst warm up operation. Further, the hybrid vehicle 20 of the embodiment determines that the forced charging with the idling of the engine 22 is to be executed when the state of charge SOC is equal to or less than the charging execution state of charge Schg that is smaller than the warm up execution state of charge Sref, when the state of charge SOC is less than the warm up execution state of charge Sref and the catalyst bed temperature Tcat is equal to or more than the charging execution temperature Tchg, and when the state of charge SOC is more than the charging execution state of charge Schg and the catalyst bed temperature Tcat is equal to or more than the charging permission lower limit temperature Tcmin based on the estimated intake air amount GAidl. Thus, the forced charging with the idling of the engine 22 is executed even if the emission is deteriorated in some degree when the state of charge SOC of the battery 50 considerably low for example as well as when the forced charging with the idling of the engine 22 can be executed without any problems relative to the catalyst bed temperature Tcat (when Tcat≧Tchg). Further, when the state of charge SOC is more than the charging execution state of charge Schg, the execution of the forced charging with the idling of the engine 22 is permitted on the condition that the exhaust gas from the engine 22 can be satisfactorily purified by the exhaust gas purifying catalyst 141. Accordingly, the state of charge SOC of the battery 50 can be ensured while preventing emission deterioration.

In the above hybrid vehicle 20, the intake air amount upon the idling of the engine 22 typically increases with the decrease of the temperature of the engine 22 and the intake air amount upon the idling of the engine 22 may be different between when the shift position SP is the P or N position for the parking and when the shift position SP is D position for the normal driving. In consideration of these, the estimated intake air amount GAidl upon the idling is derived based on the cooling water temperature Tw of the engine 22 and the shift position SP. Thus, it is possible to accurately obtain the intake air amount GAidl and appropriately determine whether the forced charging of the battery 50 with the idling of the engine 22 is to be executed or not by setting the charging permission lower limit temperature Tcmin in accordance with the derived estimated intake air amount GAidl (Step S190). Further, by changing the charging execution state of charge Schg in accordance with the state of the load of the battery 50 based on a light up state of the head and tail lights and an operation state of the air conditioning unit, it is possible to minimally ensure the state of charge SOC according to the state of the load of the battery 50 and reduce components inoperable in the hybrid vehicle 20 due to a shortage of the state of charge SOC of the battery 50. In the hybrid vehicle 20, the rotational speed Ne of the engine 22 is retained at the predetermined rotational speed by the motor MG1 upon the execution of the catalyst warm up operation and the ignition timing of the engine 22 is retarded in comparison with a normal state upon the execution of the catalyst warm up operation. Thus, the temperature of the exhaust gas increases upon the execution of the catalyst warm up operation so as to favorably facilitate the activation of the exhaust gas purifying catalyst 141 that purifies exhaust gas from the engine 22.

Figure 7:
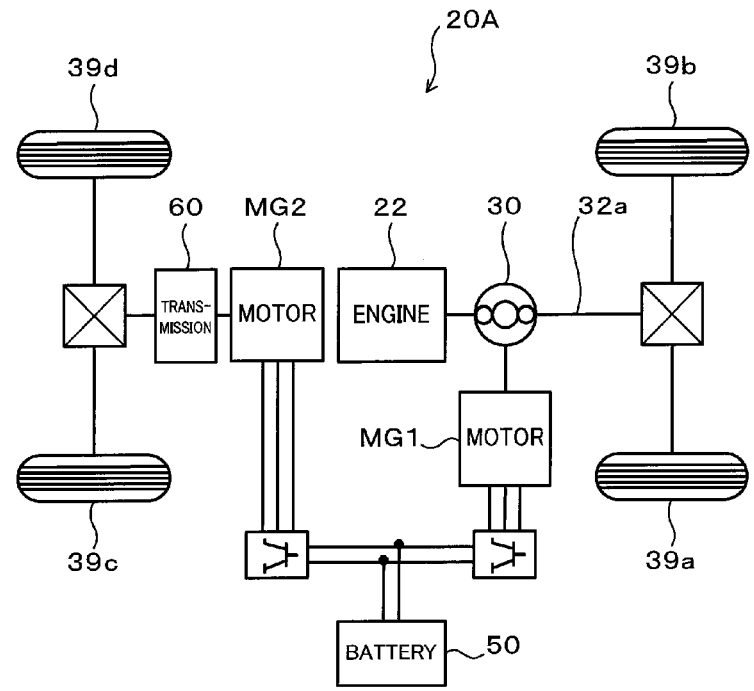
FIG. 7 is a schematic block diagram of a hybrid vehicle 20A according to a modification of the present invention.
Figure 8:
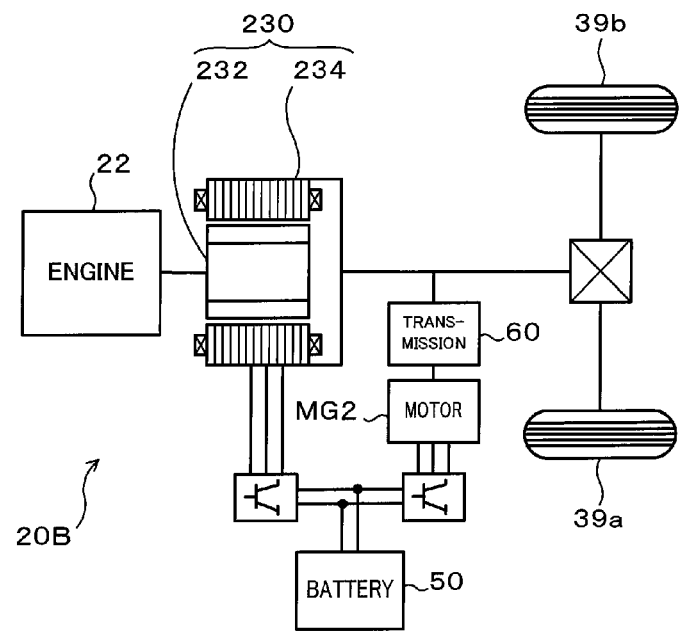
FIG. 8 is a schematic block diagram of a hybrid vehicle 20B according to a further modification of the present invention.

The above embodiment is explained that the hybrid vehicle 20 determines whether or not executing the catalyst warm up operation or the forced charging while it is stopped after the system startup. However, the hybrid vehicle 20 of the embodiment can be driven while executing the catalyst warm up operation by outputting power required by the driver to the ring gear shaft 32a or the axle from the motor MG2 even if the catalyst warm up operation of the engine 22 is executed when the shift position SP is set to the D position and the accelerator pedal 83 is depressed during the execution of the stop operation control routine in FIG. 3. Further, even if the forced charging of the battery 50 with the idling of the engine 22 is executed when the shift position SP is set to the D position and the accelerator pedal 83 is depressed during the execution of the stop operation control routine in FIG. 3, the power required by the driver can be output to the ring gear shaft 32a or the axle from the motor MG2 while continuing the forced charging of the battery 50 with the idling of the engine 22. In this case, the motor MG1 and MG2 may be controlled so that the engine 22 outputs all power required for driving the vehicle and charging the battery 50 and part of power from the engine 22 is output to the ring gear shaft 32a with the torque conversion by the power distribution integration mechanism 30, the motor MG1 and MG2. In the hybrid vehicle 20 of the embodiment, the ring gear shaft 32a or the axle is connected to the motor MG2 via the reduction gear 35 that reduces the rotational speed of the motor MG2 and transmits the reduced rotation speed to the ring gear shaft 32a. The reduction gear 35 may be replaced with a transmission that has two different speeds Hi and Lo or three or a greater number of different speeds and is designed to change the rotation speed of the motor MG2 and transmits the changed rotational speed to the ring gear shaft 32a. Although the hybrid vehicle 20 of the above described embodiment is a vehicle that outputs the power of the motor MG2 to an axle connected to the ring gear shaft 32a, an object for application of the present invention is not limited thereto. More specifically, as in the case of a hybrid vehicle 20A as a modification example shown in FIG. 7, the present invention may also be applied to a vehicle in which the power of the motor MG2 is output to an axle (axle connected to wheels 39c and 39d in FIG. 7) that is different from the axle (axle to which the wheels 39a and 39b are connected) that is connected to the ring gear shaft 32a. Further, although the hybrid vehicle 20 of the above described embodiment is a vehicle that outputs the power of the engine 22 to the ring gear shaft 32a as an axle connected to the wheels 39a and 39b via the power distribution and integration mechanism 30, an object for application of the present invention is not limited thereto. More specifically, as in the case of a hybrid vehicle 20B as a modification example shown in FIG. 8, the present invention may also be applied to a vehicle that includes a pair-rotor motor 230 that has an inner rotor 232 connected to the crankshaft of the engine 22, and an outer rotor 234 connected to the axle that outputs the power to the wheels 39a and 39b and that transmits a part of the power output from the engine 22 to the axle while converting the remainder of the power into electric power.

The correlation between the principal elements of the embodiment and modification examples, and the principal elements of the invention described in the "Disclosure of the Invention" section will now be described. That is, in the above described embodiment and modification examples, the engine 22 corresponds to "internal combustion engine", the purify unit 142 including the exhaust gas purifying catalyst 141 that purifies the exhaust gas from the engine 22 corresponds to "purifying unit", the catalyst temperature sensor 187 that detects the temperature of the exhaust gas purifying catalyst 141 corresponds to "catalyst temperature acquisition device", a combination of the motor MG1 and the power distribution integration mechanism 30, and the pair-rotor motor 230 correspond to "electric power-mechanical power input output structure", the motor MG2 corresponds to "motor", the battery 50 capable of supplying and receiving electric power from the motors MG1 and MG2 corresponds to "accumulator", the battery ECU 52 that calculates the state of charge SOC of the battery 50 corresponds to "residual capacity acquisition module", the hybrid ECU 70 that executes the processes of Step S110 and S120 in FIG. 3 corresponds to "catalyst warm up determination module", the hybrid ECU 70 that executes the processes of Step S150-S200 in FIG. 3 corresponds to "forced charging determination module", and the hybrid ECU 70 that executes the processes of Step S130, S210 and the like in FIG. 3, the engine ECU 24 and the motor ECU 40 correspond to "control module". Further, the water temperature sensor 181 that measures the cooling water temperature Tw of the engine 22 corresponds to "temperature acquisition module", the shift lever 81 corresponds to "shift position selection device", the motor MG1 corresponds to "power generation motor" and the power distribution integration mechanism 30 corresponds to "three shaft-type power input output assembly".

The "internal combustion engine" is not limited to the engine 22 that consumes a hydrocarbon fuel, such as gasoline or light oil and outputs power, but may be an internal combustion engine of any other design, for example, a hydrogen engine. The "purifying unit" may be implemented by any configuration of including a catalyst that purifies exhaust gas exhausted from the internal combustion engine. The "catalyst temperature acquisition device" is not limited to a device actually measuring the temperature of the catalyst but may be implemented by any configuration of acquiring the temperature of the catalyst such as a device estimating the temperature of the catalyst based on diverse parameters of the internal combustion engine. The "electric power-mechanical power input output structure" is not limited to the combination of the motor MG1 and the power distribution integration mechanism 30, and the pair-rotor motor 230 but may be implemented by any configuration of generating electric power through the use of at least part of power from the engine shaft connected thereto of the internal combustion engine and inputting and outputting power to the axle connected thereto with input and output of electric power. The "motor" and the "power generation motor" are not limited to the motor MG1 and MG2 constructed as the synchronous motor generator but may have any other configuration or design, for example, an induction motor. The "accumulator" is not limited to the battery 50 or the secondary cell but may be implemented by any configuration of supplying and receiving electric power from the motor and the like such as a capacitor. The "residual capacity acquisition module" may be implemented by any configuration of acquiring the residual capacity of the accumulator. The "catalyst warm up determination module" may be implemented by any configuration of determining whether the catalyst warm up operation of the internal combustion engine that facilitates the activation of the catalyst is to be executed or not based on the acquired temperature of the catalyst and the acquired residual capacity upon the system startup. The "forced charging determination module" may be implemented by any configuration of determining whether the forced charging of the accumulator with the idling of the internal combustion engine is to be executed or not based on the acquired temperature of the catalyst, the acquired residual capacity and the estimated intake air amount upon the idling of the internal combustion engine when the catalyst warm up determination module determines that the catalyst warm up operation is not to be executed. The "control module" is not limited to the combination of the hybrid ECU 70, engine ECU 24 and the motor ECU 40 but may be implemented by any configuration such as a single electronic control unit, that controls the internal combustion engine, the electric power-mechanical power input output structure and the motor so that the catalyst warm up operation is executed when the catalyst warm up determination module determines that the catalyst warm up operation is to be executed, and controls the internal combustion engine, the electric power-mechanical power input output structure and the motor so that the forced charging is executed when the forced charging determination module determines that the forced charging is to be executed. In any case, the correspondence between the main elements in the embodiment and the variant and the main elements in the invention described in "Disclosure of the Invention" do not limit the elements in the invention described in "Disclosure of the Invention" since the embodiment is an example for describing in detail the best mode for carrying out the invention described in "Disclosure of the Invention". Specifically, the embodiment is merely a detailed example of the invention described in "Disclosure of the Invention", and the invention described in "Disclosure of the Invention" should be construed on the basis of the description therein.

Hereinbefore, the embodiments of the present invention have been described with reference to drawings, however, the present invention is not limited to the above embodiments. It will be apparent that various modifications can be made to the present invention without departing from the spirit and scope of the present invention.

INDUSTRIAL APPLICABILITY

The technique of the invention is preferably applied to the manufacturing industries of hybrid vehicles.

The invention claimed is:

1. A hybrid vehicle comprising:
an internal combustion engine;
a purifying unit including a catalyst that purifies exhaust gas exhausted from the internal combustion engine;
a catalyst temperature acquisition device that acquires a temperature of the catalyst;
an electric power-mechanical power input output structure connected to a predetermined axle and an engine shaft of the internal combustion engine, the electric power-mechanical power input output structure being configured to generate electric power through the use of at least part of power from the internal combustion engine and inputting and outputting power to the axle with input and output of electric power;
a motor for inputting and outputting power to the axle or another axle that is different from the axle;
an accumulator for supplying and receiving electric power from electric power-mechanical power input output structure and the motor;
a battery ECU configured to acquire a residual capacity of the accumulator;
a hybrid ECU configures to determine whether a catalyst warm up operation of the internal combustion engine that facilitates an activation of the catalyst is to be executed or not based on the acquired temperature of the catalyst and the acquired residual capacity upon a system startup and whether a forced charging of the accumulator with an idling of the internal combustion engine is to be executed or not based on the acquired temperature of the catalyst, the acquired residual capacity and an estimated intake air amount upon the idling of the internal combustion engine when the catalyst warm up determination device determines that the catalyst warm up operation is not to be executed; and
an engine ECU and a motor ECU which control the internal combustion engine and the motor so that the catalyst warm up operation is executed when the catalyst warm up determination device determines that the catalyst warm up operation is to be executed, the engine ECU and the motor ECU are configured to control the internal combustion engine and the motor so that the forced charging is executed when the hybrid ECU determines that the forced charging is to be executed;
wherein the hybrid ECU determines that the catalyst warm up operation is to be executed when the residual capacity of the accumulator is equal to or more than a predetermined warm up execution residual capacity and the temperature of the catalyst is equal to or less than a predetermined warm up execution temperature, and
wherein the hybrid ECU determines that the forced charging is to be executed when the residual capacity of the accumulator is equal to or less than a predetermined charging execution residual capacity that is smaller than the warm up execution residual capacity, when the residual capacity of the accumulator is less than the warm up execution residual capacity and the temperature of the catalyst is equal to or more than a predetermined charging execution temperature, and when the residual capacity of the accumulator is more than the charging execution residual capacity and the temperature of the catalyst is equal to or more than a predetermined charging permission lower limit temperature based on the estimated intake air amount.

2. A hybrid vehicle according to claim 1, further comprising:
a temperature acquisition module that acquires a temperature of the internal combustion engine; and
a shift position selection device that allows a driver to select at least a shift position for a stop of the vehicle and a shift position for a normal driving;
wherein the estimated intake air amount is derived based on the acquired temperature of the internal combustion engine and the shift position, and wherein the charging permission lower limit temperature is changed in accordance with the derived estimated intake air amount.

3. A hybrid vehicle according to claim 1, wherein the charging execution residual capacity is changed in accordance with a state of a load of the accumulator.

4. A hybrid vehicle according to claim 1, wherein a rotational speed of the internal combustion engine is retained at a predetermined rotational speed by the electric power-mechanical power input output structure upon an execution of the catalyst warm up operation and an ignition timing of the internal combustion engine is retarded in comparison with a normal state upon the execution of the catalyst warm up operation.

5. A hybrid vehicle according to claim 1, wherein the hybrid ECU determines whether or not executing the catalyst warm up operation or the forced charging while the engine is stopped after a system startup.

6. A hybrid vehicle according to claim 1 the electric power-mechanical power input output structure further comprising a power generation motor capable of inputting and outputting power; and three shaft-type power input output assembly connected to three shafts, the axle, the engine shaft of the internal combustion engine and a rotating shaft of the power generation motor, the three shaft-type power input output assembly configured to input and output power to one remaining shaft, based on input and output of power from and to any two shafts selected among the three shafts.

7. A control method of a hybrid vehicle including an internal combustion engine, a purifying unit including a catalyst that purifies exhaust gas exhausted from the internal combustion engine, an electric power-mechanical power input output structure connected to a predetermined axle and an engine shaft of the internal combustion engine, the electric power-mechanical power input output structure capable of generating electric power through the use of at least part of power from the internal combustion engine and inputting and outputting power to the axle with input and output of electric power, a motor capable of inputting and outputting power to the axle or another axle that is different from the axle and an accumulator capable of supplying and receiving electric power from electric power-mechanical power input output structure and the motor, the method comprising the steps of:
(a) determining whether a catalyst warm up operation of the internal combustion engine that facilitates an activation of the catalyst is to be executed or not based on a temperature of the catalyst and a residual capacity of the accumulator;
(b) determining whether a forced charging of the accumulator with an idling of the internal combustion engine is to be executed or not based on the temperature of the catalyst, the residual capacity of the accumulator and an estimated intake air amount upon the idling of the internal combustion engine when the Step (a) determines that the catalyst warm up operation is not to be executed; and
(c) controlling the internal combustion engine, the electric power-mechanical power input output structure and the motor so that the catalyst warm up operation is executed when the Step (a) determines that the catalyst warm up operation is to be executed, and controlling the internal combustion engine, the electric power-mechanical power input output structure and the motor so that the forced charging is executed when the Step (b) determines that the forced charging is to be executed,
wherein the Step (a) determines that the catalyst warm up operation is to be executed when the residual capacity of the accumulator is equal to or more than a predetermined warm up execution residual capacity and the temperature of the catalyst is equal to or less than a predetermined warm up execution temperature, and
wherein the Step (b) determines that the forced charging is to be executed when the residual capacity of the accumulator is equal to or less than a predetermined charging execution residual capacity that is smaller than the warm up execution residual capacity, when the residual capacity of the accumulator is less than the warm up execution residual capacity and the temperature of the catalyst is equal to or more than a predetermined charging execution temperature, and when the residual capacity of the accumulator is more than the charging execution residual capacity and the temperature of the catalyst is equal to or more than a predetermined charging permission lower limit temperature based on the estimated intake air amount.

8. A control method of a hybrid vehicle according to claim 7, wherein the estimated intake air amount is derived based on the temperature of the internal combustion engine and the shift position of a shift position selection device that allows a driver to select at least a shift position for a stop of the vehicle and a shift position for a normal driving, and
the control method further comprising changing the charging permission lower limit temperature in accordance with the derived estimated intake air amount.

9. A control method of a hybrid vehicle according to claim 7, further comprising changing the charging execution residual capacity in accordance with a state of a load of the accumulator.

10. A control method of a hybrid vehicle according to claim 7, further comprising retaining a rotational speed of the internal combustion engine at a predetermined rotational speed by the electric power-mechanical power input output structure upon an execution of the catalyst warm up operation at the Step (c) and retarding an ignition timing of the internal combustion engine in comparison with a normal state upon the execution of the catalyst warm up operation at the Step (c).

11. A control method of a hybrid vehicle according to claim 7, further comprising executing the Step (a) while the engine is stopped after a system startup.

12. A control method of a hybrid vehicle according to claim 7, the electric power-mechanical power input output structure of the hybrid vehicle further comprising a power generation motor and three shaft-type power input output assembly connected to three shafts, the axle, the engine shaft of the internal combustion engine and a rotating shaft of the power generation motor, the control method further comprising:
inputting and outputting power with the power generation motor; and
inputting and outputting power to one remaining shaft, based on input and output of power from and to any two shafts selected among the three shafts, with the three shaft-type power input output assembly.

* * * * *

UNITED STATES PATENT AND TRADEMARK OFFICE
CERTIFICATE OF CORRECTION

PATENT NO.       : 8,499,547 B2                                                      Page 1 of 1
APPLICATION NO.  : 12/532966
DATED            : August 6, 2013
INVENTOR(S)      : Noritake Mitsutani It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 488 days.

Signed and Sealed this

Fifteenth Day of September, 2015

Michelle K. Lee
*Director of the United States Patent and Trademark Office*